United States Patent
Berg

(10) Patent No.: US 12,176,613 B2
(45) Date of Patent: Dec. 24, 2024

(54) INTEGRATED LEAKY FEEDER AND MESH NETWORK SYSTEM

(71) Applicant: Redpath Canada Limited, North Bay (CA)

(72) Inventor: Jeremy Gerald Fernand Berg, North Bay (CA)

(73) Assignee: Redpath Canada Limited, North Bay (CA)

( * ) Notice: Subject to any disclaimer, the term of this patent is extended or adjusted under 35 U.S.C. 154(b) by 0 days.

(21) Appl. No.: 17/309,156

(22) PCT Filed: Nov. 4, 2019

(86) PCT No.: PCT/CA2019/051561
§ 371 (c)(1),
(2) Date: Apr. 30, 2021

(87) PCT Pub. No.: WO2020/087186
PCT Pub. Date: May 7, 2020

(65) Prior Publication Data
US 2021/0391653 A1    Dec. 16, 2021

Related U.S. Application Data

(60) Provisional application No. 62/754,975, filed on Nov. 2, 2018.

(51) Int. Cl.
*H01Q 1/04*        (2006.01)
*H01Q 13/20*    (2006.01)
*H04W 84/18*    (2009.01)

(52) U.S. Cl.
CPC ............. *H01Q 13/203* (2013.01); *H01Q 1/04* (2013.01); *H04W 84/18* (2013.01)

(58) Field of Classification Search
CPC ....... H01Q 13/203; H01Q 1/04; H04W 84/18; H04B 3/52; H04B 3/54
See application file for complete search history.

(56) References Cited

U.S. PATENT DOCUMENTS 3,916,311 A  * 10/1975  Martin ................. H04B 5/0018
                                                    455/523
5,282,239 A  *  1/1994  Yokoi ................... H04W 88/08
                                                    455/437
5,504,809 A  *  4/1996  Chalmers .............. H04M 9/001
                                                    379/167.08

(Continued)

FOREIGN PATENT DOCUMENTS

GB          2235336 A       2/1991
WO       2008049170 A1     5/2008

(Continued)

OTHER PUBLICATIONS

Updyke et al., An evaluation of leaky feeder communication in underground mines—Final report, Jun. 1980 (Year: 1980).*

(Continued)

*Primary Examiner* — Dameon E Levi
*Assistant Examiner* — Anh N Ho
(74) *Attorney, Agent, or Firm* — CPST Intellectual Property Inc.; Brett J. Slaney

(57) ABSTRACT

There is provided an integrated leaky feeder and mesh network system. The system includes a plurality of mesh nodes, each mesh node comprising a radio, at least one of the mesh nodes being powered by a power source. The system also includes a radiating coaxial cable connecting the plurality of mesh nodes to provide a leaky feeder signal between the nodes.

15 Claims, 11 Drawing Sheets

(56) References Cited

U.S. PATENT DOCUMENTS

| | | | | |
|---|---|---|---|---|
| 5,697,067 A | * | 12/1997 | Graham | H04B 17/17 |
| | | | | 455/523 |
| 8,294,568 B2 | * | 10/2012 | Barrett | H04W 4/023 |
| | | | | 340/572.1 |
| 9,258,722 B2 | | 2/2016 | Schmidt et al. | |
| 2005/0040991 A1 | * | 2/2005 | Crystal | H01Q 1/36 |
| | | | | 343/745 |
| 2006/0046642 A1 | * | 3/2006 | Bassiri | H04W 16/26 |
| | | | | 455/7 |
| 2008/0076383 A1 | * | 3/2008 | Barrett | E21F 17/18 |
| | | | | 455/404.1 |
| 2016/0036574 A1 | * | 2/2016 | Rose | B61L 3/227 |
| | | | | 370/329 |
| 2018/0167223 A1 | * | 6/2018 | Pratap | H04L 12/10 |

FOREIGN PATENT DOCUMENTS

| | | | | |
|---|---|---|---|---|
| WO | WO-2010107440 A1 | * | 9/2010 | G01D 21/00 |
| WO | WO-2015006836 A1 | * | 1/2015 | H04M 11/062 |

OTHER PUBLICATIONS

Bias Tee, 2016, Microwaves101.com, captured by Wayback Machine, https://web.archive.org/web/20160924022645/http://www.microwaves101.com:80/encyclopedias/bias-tee (Year: 2016).*

International Search Report issued in corresponding PCT Application No. PCT/CA2019/051561; search completed Dec. 10, 2019.

* cited by examiner

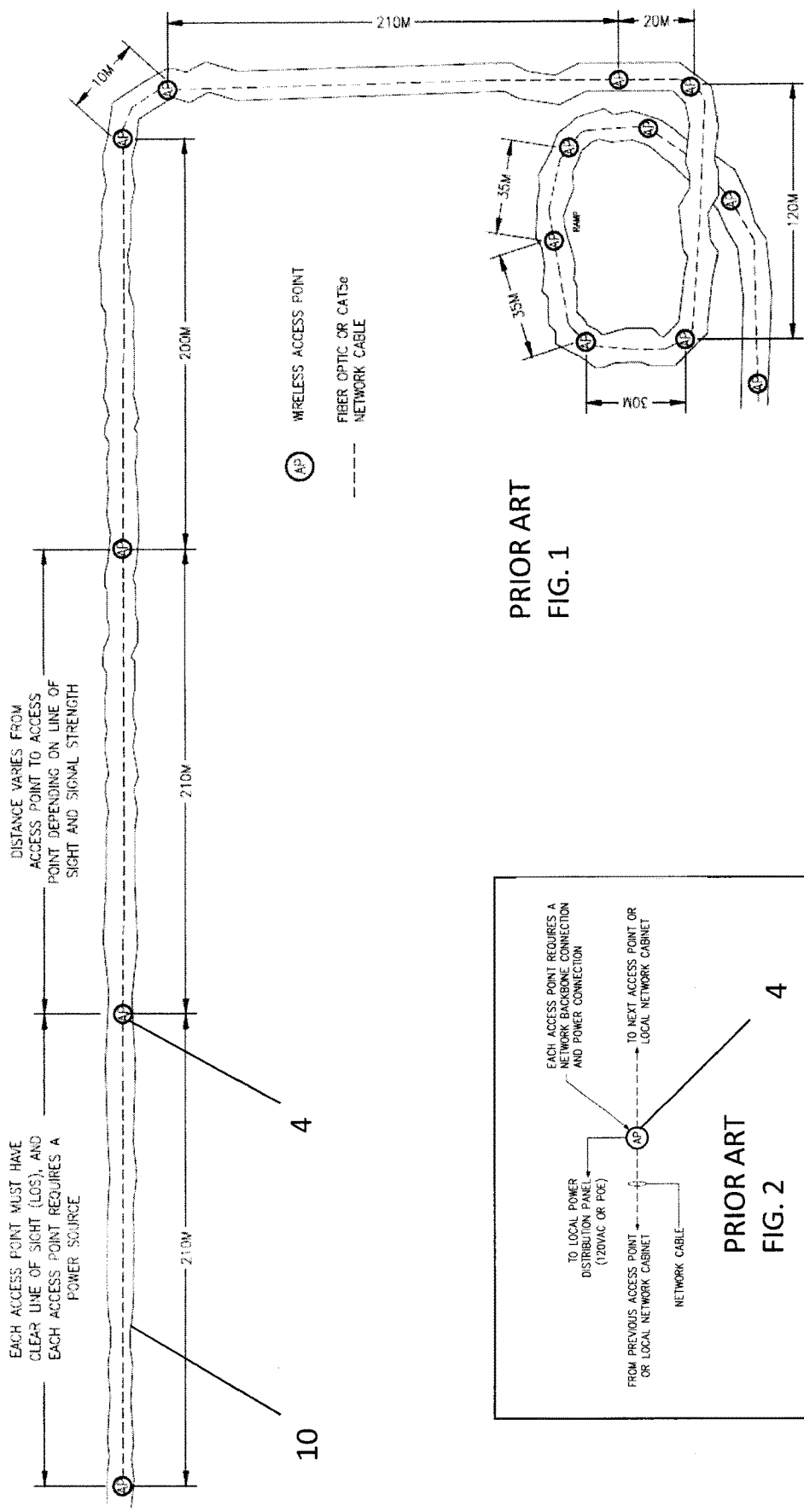
PRIOR ART
FIG. 1
PRIOR ART
FIG. 2

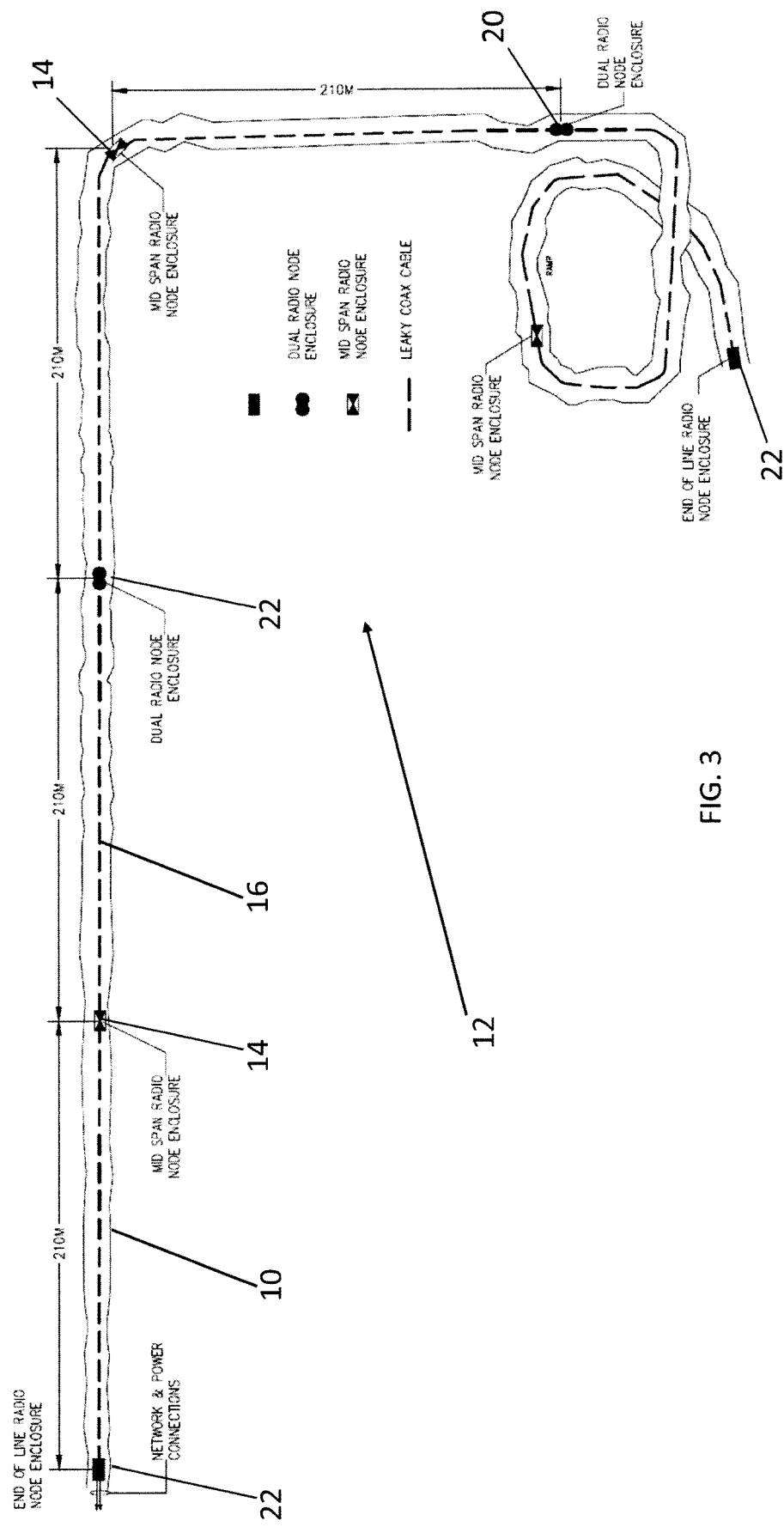
FIG. 3

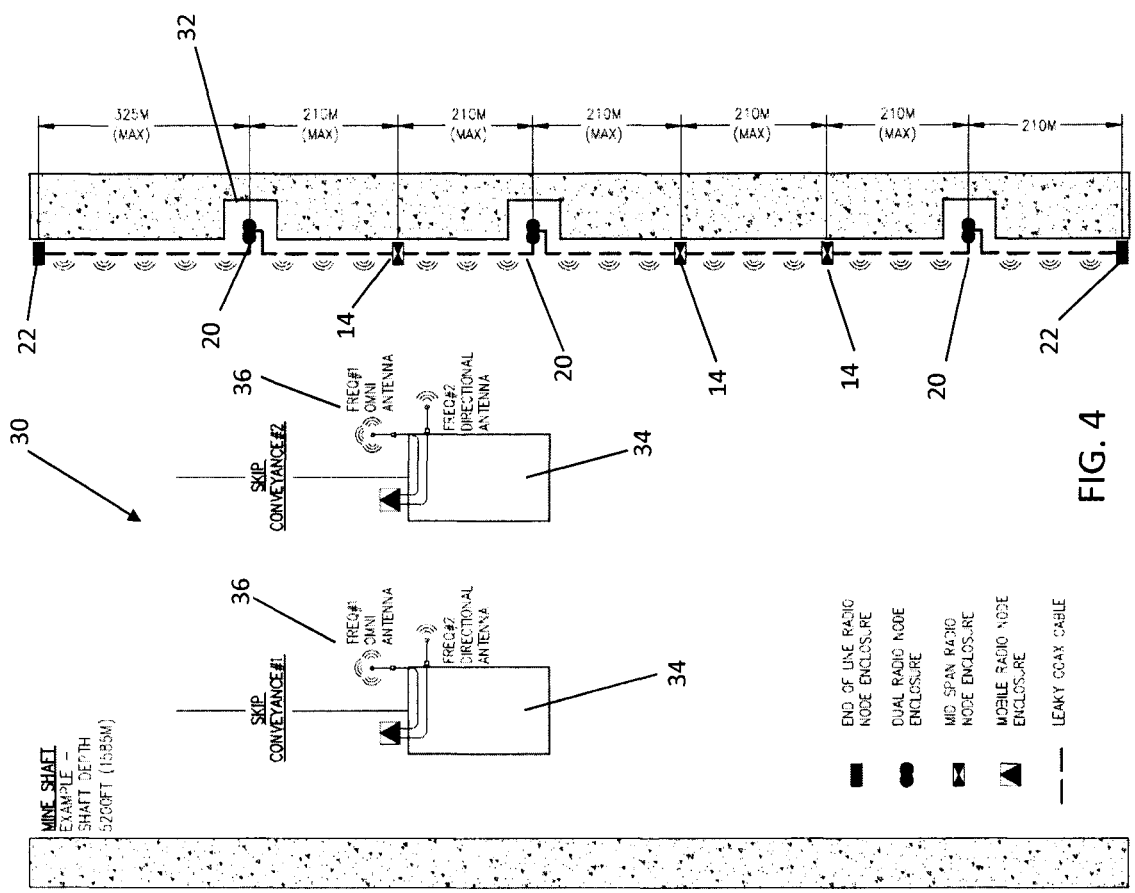
FIG. 4

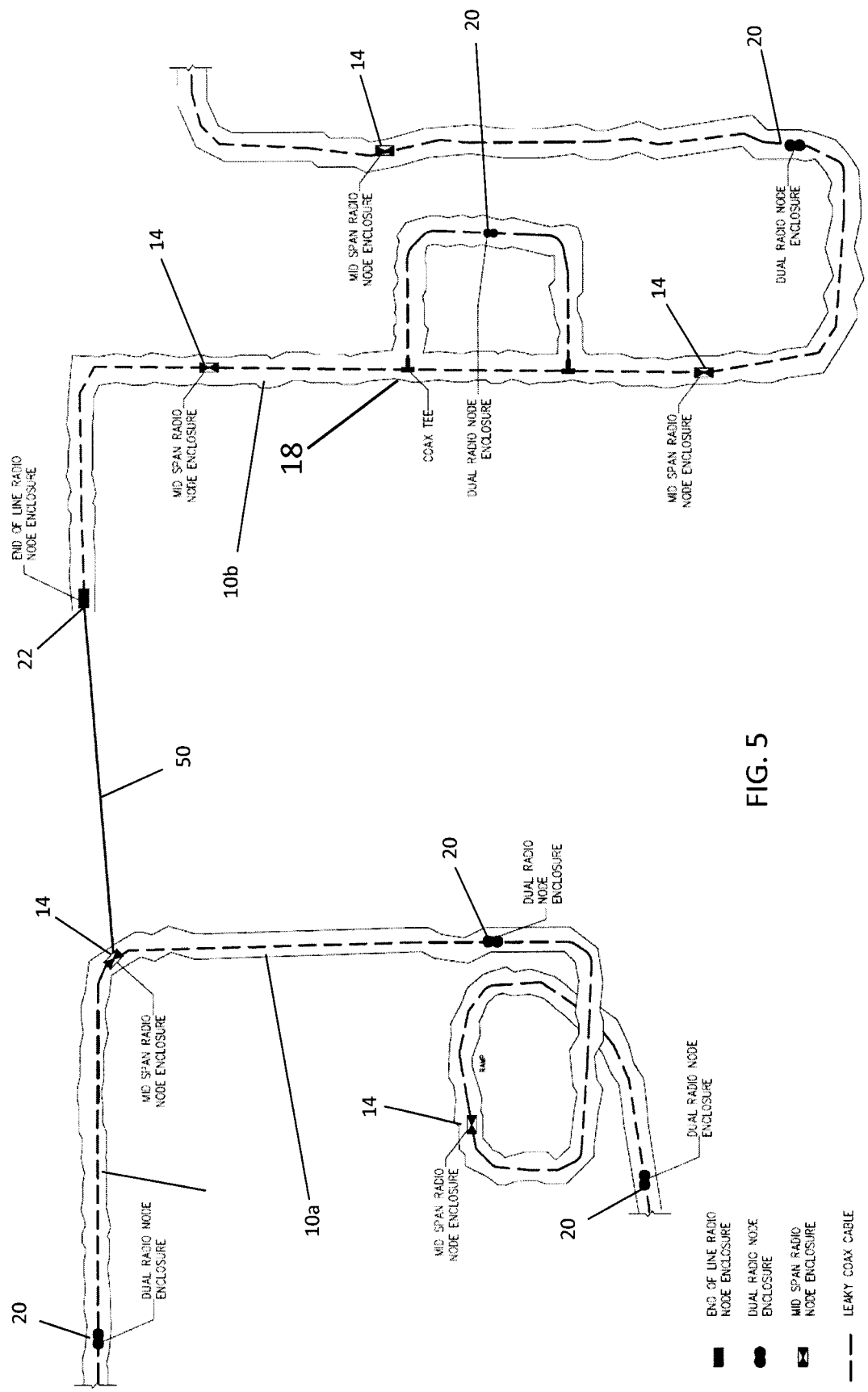
FIG. 5

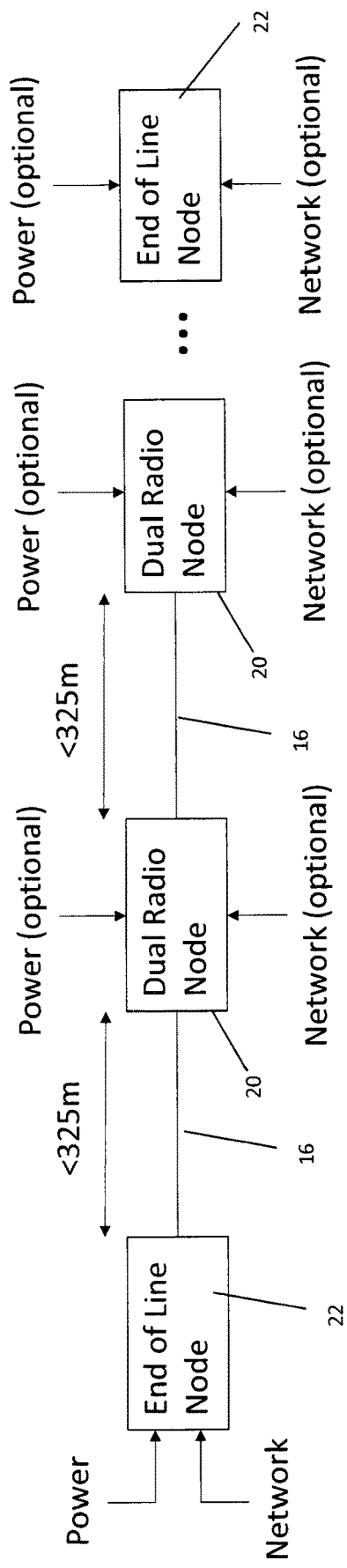
FIG. 6a

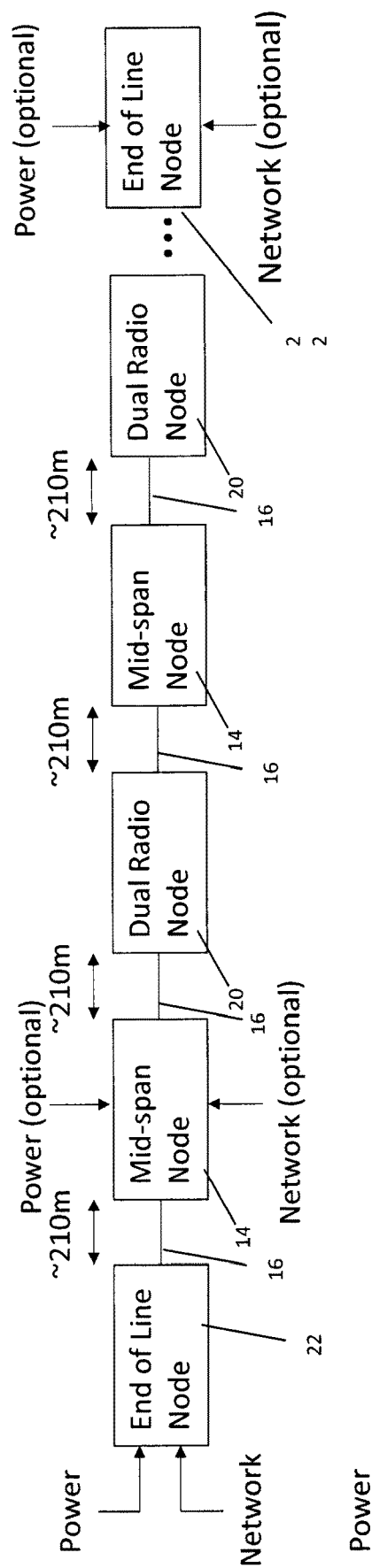
FIG. 6b

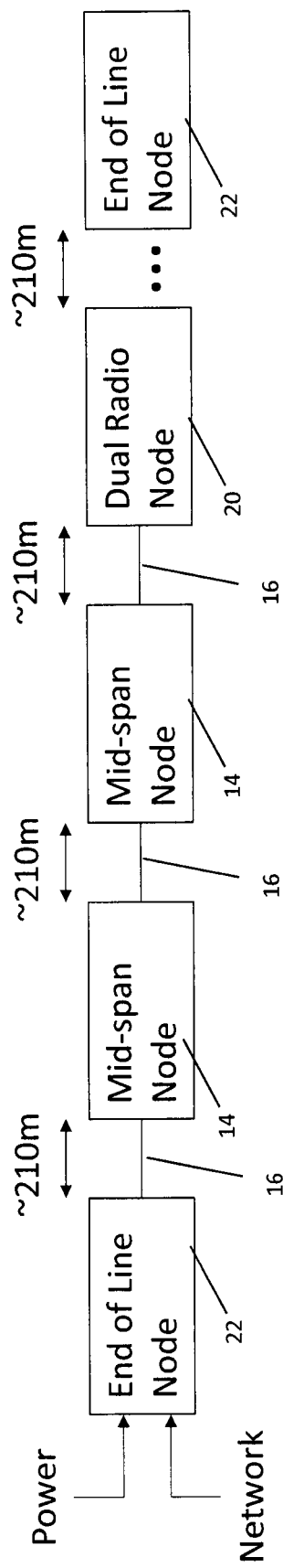
FIG. 6c

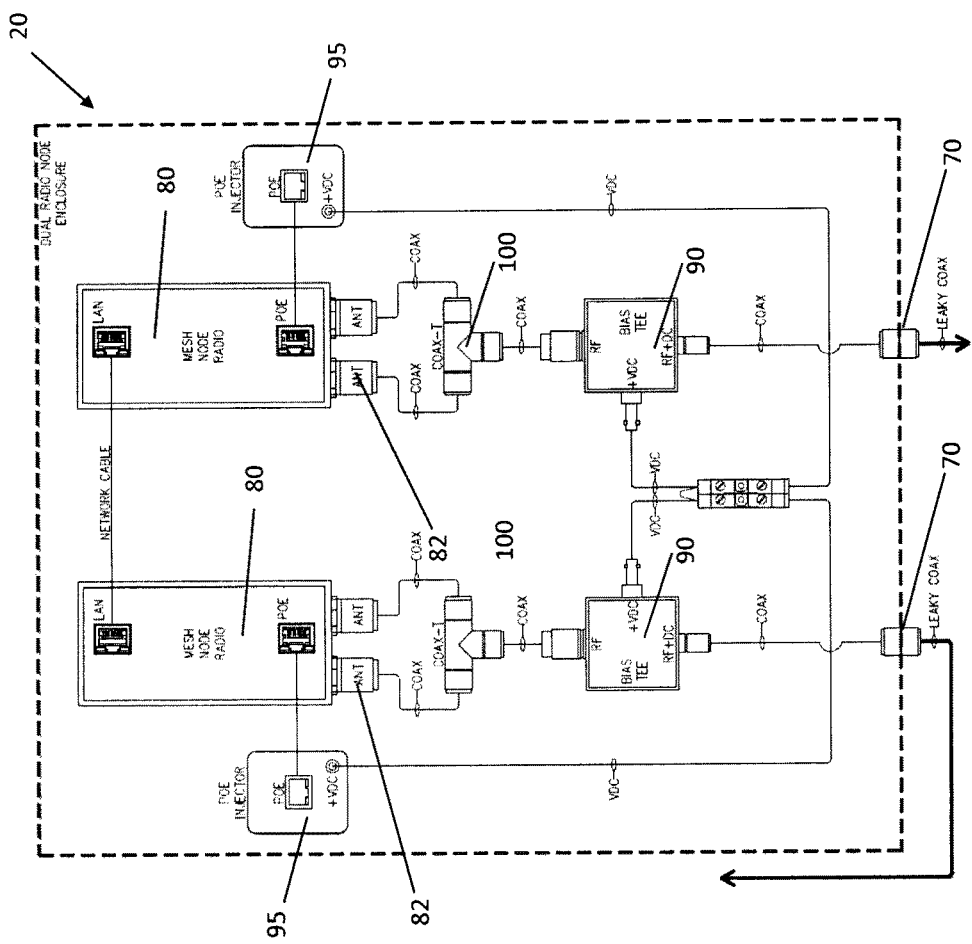
FIG. 8
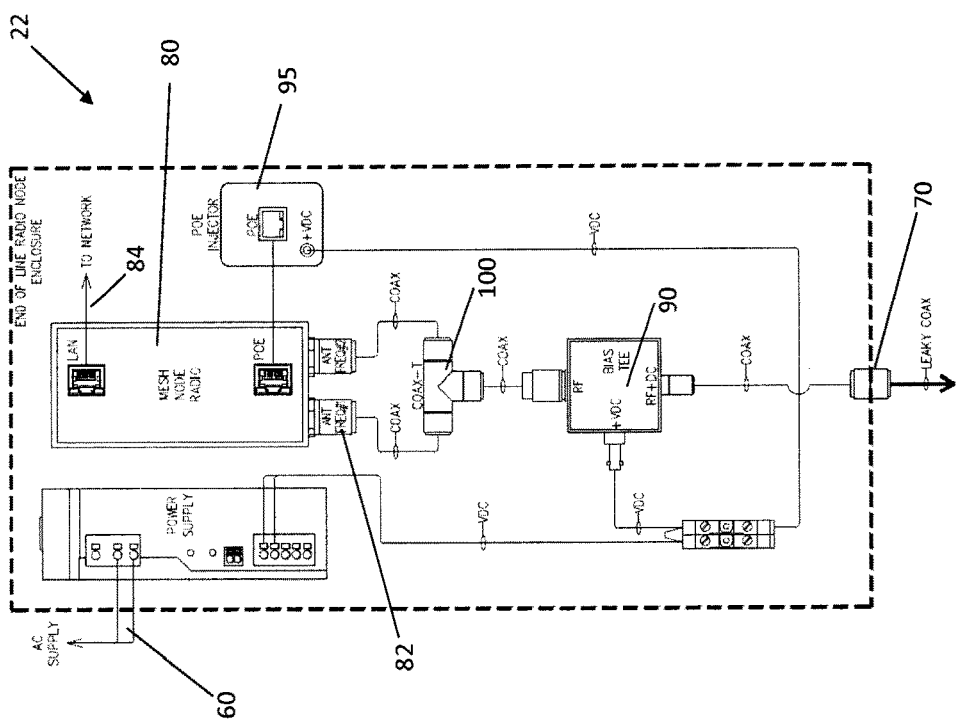
FIG. 7

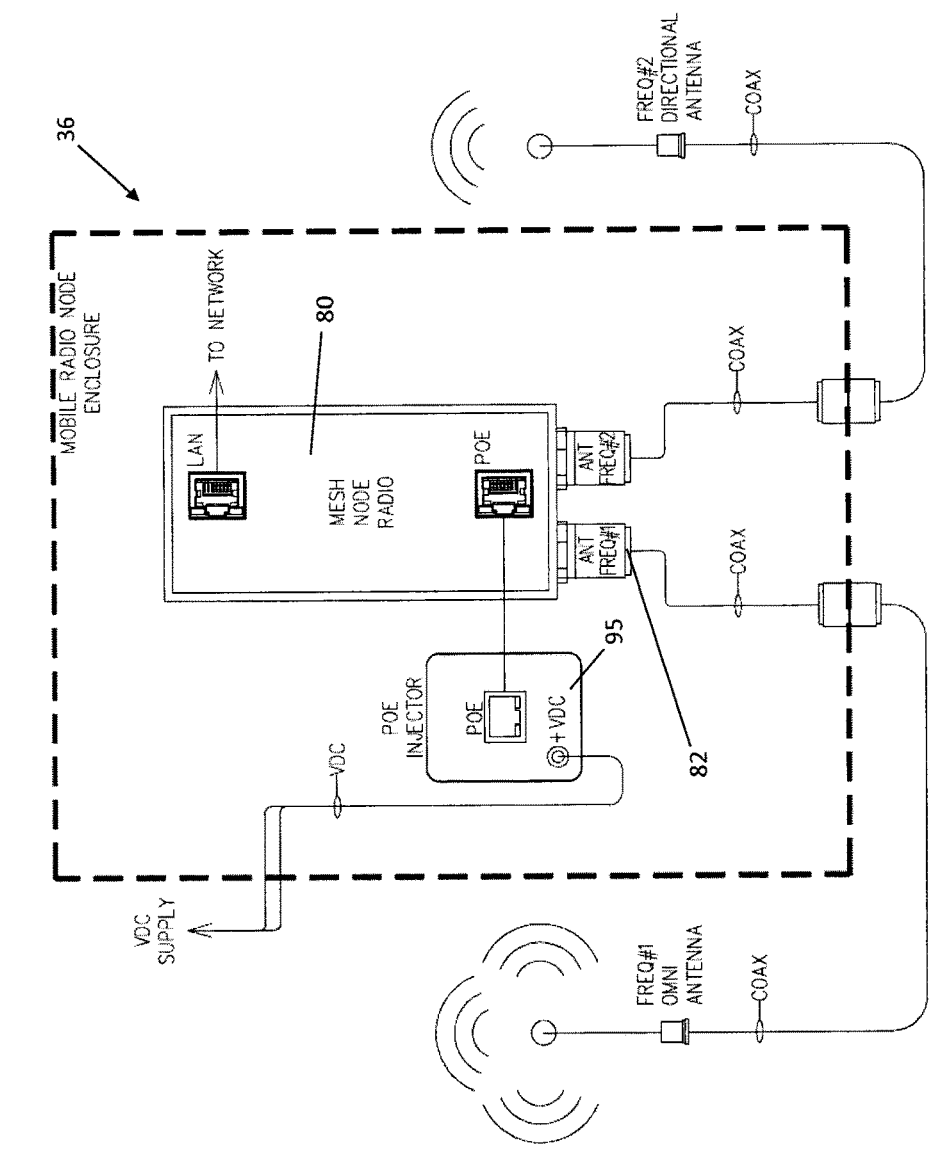
FIG. 10
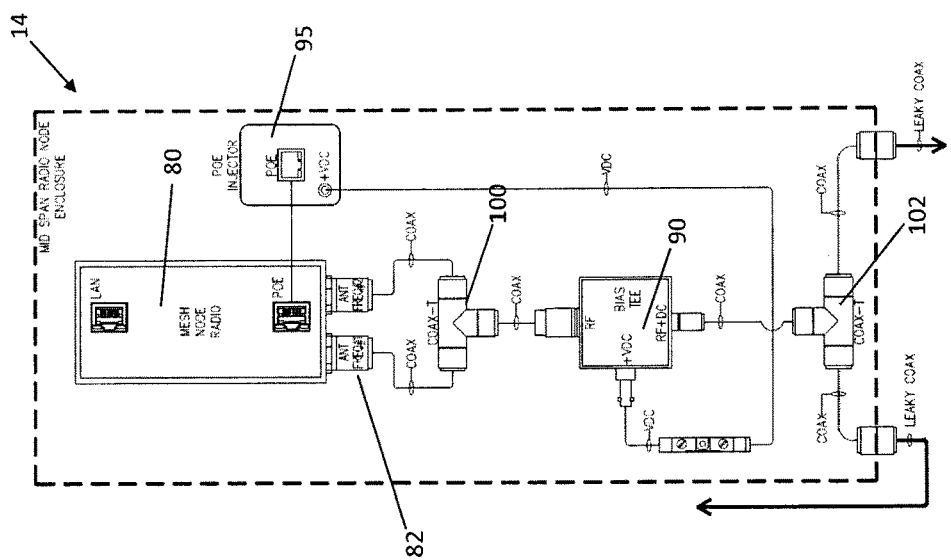
FIG. 9

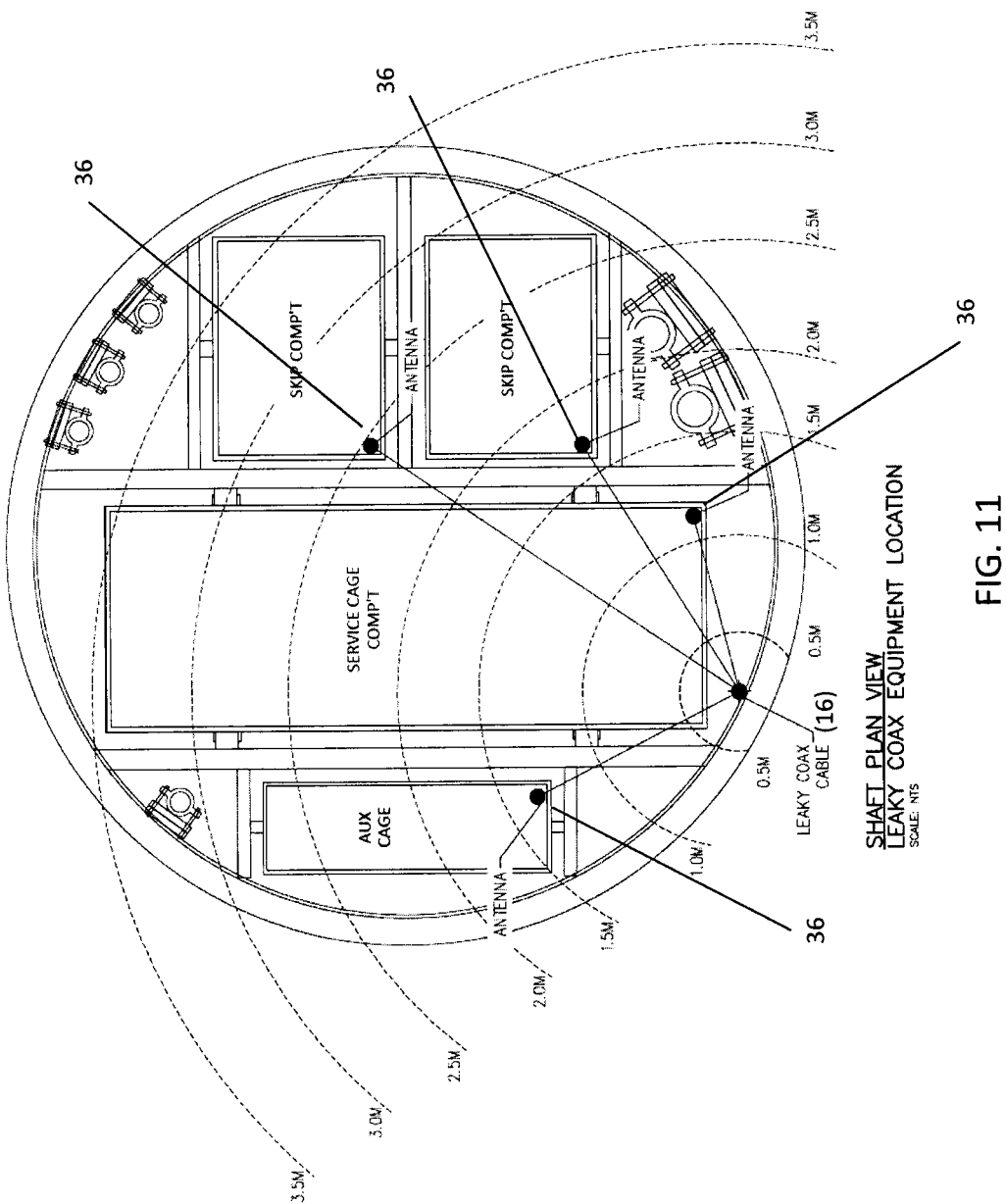
FIG. 11

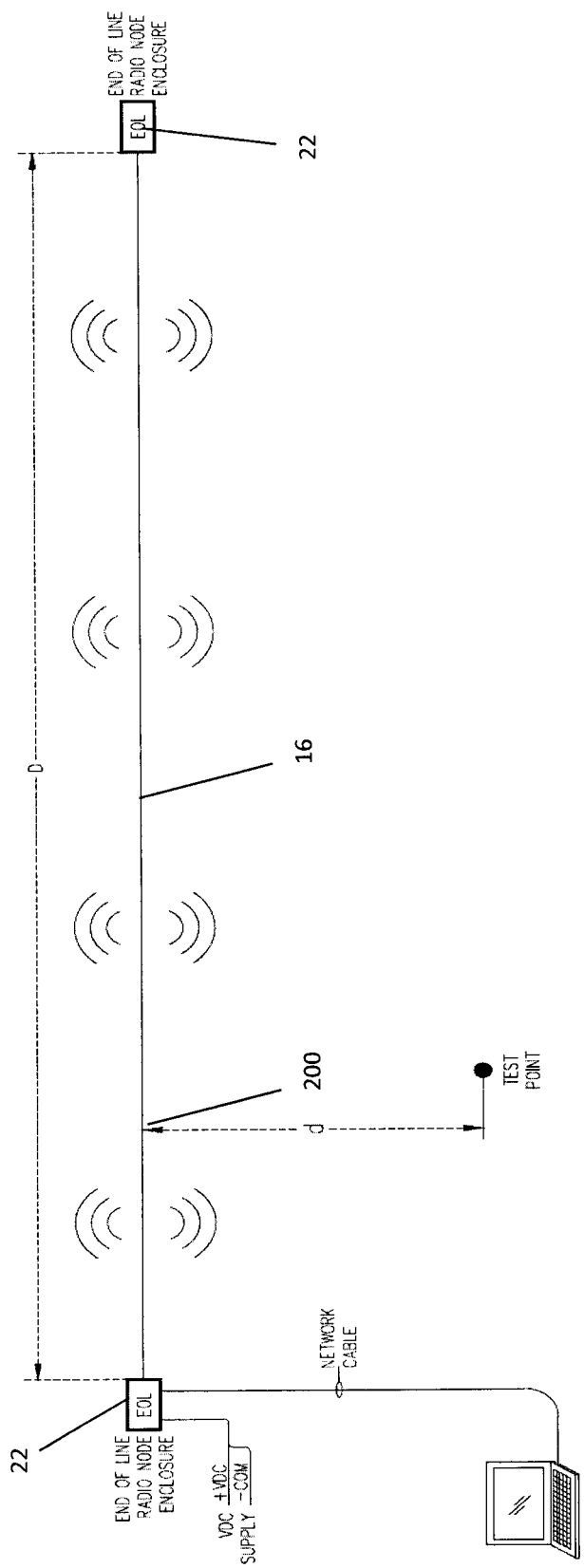
FIG. 12

INTEGRATED LEAKY FEEDER AND MESH NETWORK SYSTEM

CROSS-REFERENCE TO RELATED APPLICATION(S)

This application is a National Entry of PCT Application No. PCT/CA2019/051561, filed on Nov. 4, 2019, which claims priority to U.S. Provisional Patent Application No. 62/754,975 filed on Nov. 2, 2018, the contents of which are incorporated herein by reference, in their entirety.

TECHNICAL FIELD

The following relates to communication systems, particularly an integrated leaky feeder and mesh network system, suitable for enabling wireless communications in subterranean, isolated and/or remote areas.

BACKGROUND

Prior to the 1960s, wireless voice communication was accomplished using a so-called "walkie-talkie". This arrangement was configured to modulate voice onto a carrier frequency that can be transmitted via radio frequencies (RF) to any walkie-talkie device within range, for demodulation. This basic form of wireless communication could be improved by adding a central tower to act as a repeater to create a point-multipoint communication system that would allow one voice to be heard on any device within transmission range of the central tower.

At frequencies above the very high frequency (VHF) band, radio waves do not propagate well in underground environments. These frequencies are typically unable to pass through, for example, dense rock, and are thus not able to communicate around corners or between underground levels.

This issue is particularly relevant in an underground mine environment, e.g., inhibiting the ability to communicate from one mine level to the next. To address this problem, leaky feeder cables were implemented. These cables would carry the signal along a central conductor and "leak" or radiate small amounts of RF along its length. In the same way, the cable would also receive signals from nearby handheld devices. Once the signal degraded below a useful threshold, an amplifier could be added to boost the signal for further transmission. This type of technology was pioneered in mines during the 1960s and is still utilized today.

A traditional leaky feeder system includes the following primary components: mobile radio transceivers, a base station transceiver/repeater, leaky feeder cable antennae, and line amplifiers. Although some improvements have been made to this technology over time, the technology remains limited to use in the VHF or ultra-high frequency (UHF) bands and has very limited data transmission capabilities when compared to modern packet switched wireless networks (e.g., IEEE 802.11).

Mesh networks were originally developed for military use, to facilitate rapid deployment and dynamic topologies. In this topology, infrastructure nodes are interconnected in a way that multiple routes exist between two points in the network. These networks self-organize and self-configure thus allowing for routes to change based on real-time connection speeds, the number of hops, load utilization and many other parameters. Mesh topologies can be used for hardwired networks, and in wireless networks where line-of-sight between infrastructure nodes is a critical part of the design. For this reason, mesh networks are gaining popularity in the open pit mining industry but are not well suited for an underground tunneling environment.

The most common topology for local wireless networks currently involves one or more access points offering connectivity to client devices. In this type of network client devices do not connect directly to one another and can only communicate via the access point, and a hardwired network is used to interconnect each access point. FIGS. 1 and 2 illustrate an example of a wireless network deployed in a tunnel network 10 of a mine, using a number of wireless nodes 4 (e.g., wireless access points as shown in FIG. 2). As can be seen in FIG. 1, the access points must be interconnected using a protocol which differs from the protocol used to connect with client devices. Typically, this is done using CAT5e cabling and Ethernet (IEEE 302.3), but where the distance between nodes exceeds a rated distance (e.g., 100 m), a fiber optic cable or other alternative media conversion is likely required. Moreover, a network client moving between access points can experience a break in communication before making network connections between nodes 4.

Protocols do exist to bridge access points wirelessly (e.g., a wireless distribution system (WDS)), but these are generally for static installations because they require all access points to use the same channel and authentication and each neighbor would need to be manually configured, meaning such implementations are typically not self-organizing nor self-configuring.

Protocols also exist to repeat access points, but this can significantly reduce bandwidth due to re-transmission, and is not found to be suitable for several hops.

It is an object of the following to provide a communication system and methods therefore that address the above-noted concerns.

SUMMARY

There is provided an integrated leaky feeder and mesh network system, comprising: a plurality of mesh nodes, each mesh node comprising a radio, at least one of the mesh nodes being powered by a power source; and a radiating coaxial cable connecting the plurality of mesh nodes to provide a radio signal between the nodes.

BRIEF DESCRIPTION OF THE DRAWINGS

Embodiments will now be described with reference to the appended drawings wherein:

FIG. 1 is an illustrative schematic diagram of a prior art wireless access point communication system deployed in an underground mine;

FIG. 2 is a block diagram of an example of a wireless access point in the prior art, suitable for use in the system shown in FIG. 1;

FIG. 3 is a schematic diagram of an integrated leaky feeder and mesh network communication system deployed in a tunnel network of an underground mine;

FIG. 4 is a depiction of an integrated leaky feeder and mesh network system deployed in a mine shaft;

FIG. 5 is a schematic diagram of the communication system shown in FIGS. 3 and 4 adapted to join isolated segments of the system using an alternate communication medium therebetween;

FIGS. 6a, 6b and 6c are block diagrams of a series of nodes and node types for the integrated leaky feeder and mesh network in various configurations;

FIG. 7 is a block diagram of an example of an end of line node;

FIG. 8 is a block diagram of an example of a dual radio node used to extend coverage;

FIG. 9 is a block diagram of an example of a mid-span node used to increase signal power between long runs;

FIG. 10 is a block diagram of an example of a mobile radio node;

FIG. 11 is a schematic diagram of a test set-up for a first test conducted on the system; and FIG. 12 is a schematic diagram of a test set-up for a second test conducted on the system.

DETAILED DESCRIPTION

It has been found that while access points using leaky feeder cables as antennas could improve performance in underground environments, such an implementation would still require a separate hardwired network to provide node interconnection. Depending on the spacing of these access points, it may be required to use fiber optic cable, which is best suited for permanent and fixed environments. Relying on fiber optics generally makes for much slower deployment when compared to copper solutions, particularly when installation occurs in an underground mining environment. Moreover, overlapping cables need to be planned from each access point to ensure no gap in coverage within an underground tunnel. As such, this type of network is normally considered to be best suited for fixed/permanent installations.

The integrated leaky feeder and mesh network system described herein provides a mechanism for extending wireless digital communication services (e.g., voice, video, data, etc.) throughout large and complex enclosed spaces or to contain these services along a predefined pathway. The network is propagated using self-forming and self-healing nodes which are physically interconnected using radiating coaxial cable (also referred to herein as the radiating cable, and/or the leaky coaxial cable). This is achieved in part by interconnecting antenna ports using radiating coaxial cable to build a hardwired backhaul link. Along the backhaul pathway (i.e. along the radiating cable), compatible wireless devices (e.g., Wi-Fi-enabled devices) can connect and link to a standard Ethernet network. This is particularly advantageous in tunnels and mine shafts.

In the proposed integrated system, the radiating cable is the backbone, not an optional gateway. Moreover, instead of using periodic amplifiers to amplify the head-end signal, each node generates a new signal. The radiating cable (also referred to herein as a leaky feeder), is part of the mesh network and each segment of radiating cable can carry a different signal. In this system, the radiating cable portion of the system operates at the same frequency and can be deployed in a way that uses fewer components to distribute connectivity to underground devices.

Turning now to the figures, FIGS. 3 and 5 illustrates an example tunnel 10 in an underground mine providing an illustrative example of the many pathways in such a tunnel 10 network. It should be appreciated that the tunnel 10 and associated distances shown in FIG. 3 are for illustrative purposes only, specific to this example, and that the principles discussed herein can be adapted to any configuration of tunnel 10 network. An integrated leaky feeder and mesh network system 12 is deployed in the tunnel 10 to provide communication coverage within this underground environment, using a network of radiating cables 16, coax tees 18 (where appropriate-see FIG. 5), mid-span mesh nodes 14, dual radio mesh nodes 20, and end of line mesh nodes 22. By connecting the radiating cables 16 (e.g., at 2.4 GHZ), the system 12 can simultaneously provide a hardwired backhaul link and RF coverage for standard wireless (e.g. Wi-Fi-enabled) devices. With this arrangement, DC voltage can also be injected onto the same radiating cable 16 to provide power to the mesh nodes 14, 20, 22. The system 12 therefore provides an improvement to existing leaky feeder systems to incorporate higher bandwidth, more fault tolerance and a wired and wireless connection method that is compatible with a widely accepted standard.

FIG. 4 shows an example deployment in a mineshaft 30 where dual radio nodes 20 are installed on the station levels 32 and mid-span mesh nodes 14 are used in between, when the distance between stations is greater than a certain threshold, for example, 325 m. The hoist conveyances 34 are equipped with mobile radio nodes 36 to provide seamless connectivity to the network infrastructure at all points in the mine. To optimize performance, it has been found that using high gain directional antennas are optimal on the mobile radio nodes 36 for connection to the radiating cable 16. An omni-directional antenna can also be used to provide a local Wi-Fi signal to smaller handheld and mobile devices on the conveyance (i.e. handheld phones, laptops, cameras, etc.)

As can be appreciated from FIGS. 3, 4 and 5, the system 12 integrates the benefits of a leaky feeder approach, into a mesh network. By replacing the air gap between infrastructure nodes in a traditional wireless mesh network with a radiating coaxial cable 16, a hardwired mesh is created that can also accommodate the connection of wireless clients within several meters of the radiating cable 16. Each node 14, 20, 22, 36 creates a new signal at each transceiver, eliminating the need for amplifiers. As with any mesh network, as the number of hops along a route increases, so does the latency. For this reason, each node 14, 20, 22, 36 has the ability to be connected to a network via a standard Ethernet connection (IEEE 802.3) to bridge sections where many sequential hops occur (e.g., in a long single heading). In addition to addressing the problem of latency, this also offers fault-tolerance which can be incorporated into the network design.

FIG. 5 illustrates that the system 12 need not be contiguous, in that isolated tunnel segments 10a, 10b can be connected using an alternative communication medium 50 such as a fiber or wireless connection. This is particularly advantageous in mines or other tunneled environments that have isolated segments both on the same "level" or at different levels. Since standard Ethernet is used, the network could also be routed to the Internet to link various sites located in different areas (e.g., using VPN tunnels). It can also be appreciated that the system 12 can be adapted to provide Internet connectivity along its length if routed onto the public network or could be isolated from the Internet if so desired.

Turning now to FIG. 6a, a schematic view of a series of nodes and node types is shown, each node being connected via a radiating (or leaky coaxial) cable 16. An end of line node 22 receives power and network connections for distribution to succeeding nodes. The end of line node 22 is in turn connected to a dual radio node 20 via a radiating cable 16. In this example, the dual radio node 20 is in turn connected to another dual radio node 20 also via a radiating cable 16. This process can be repeated indefinitely by adding additional source network connections as required to reduce latency caused by successive hops or by adding additional power supplies to compensate for voltage drop.

FIG. 6b shows another configuration whereby a mid-span mesh node 14 is introduced to increase the signal strength between successive dual radio nodes 20. Since a mid-span mesh node 14 is smaller in size and contains only one radio, it may be useful to use a mid-span mesh node 14 where space is limited. For example, in a mineshaft where station levels are spaced farther than 325 m apart, as shown in FIG. 4. A mid-span mesh node 14 may be installed on the shaft wall. A mid-span mesh node 14 may also be used to provide a hardwired network access point and/or power for various types of instrumentation that is not equipped with a wireless radio.

FIG. 6c shows yet another possible configuration whereby multiple mid-span mesh nodes 14 are used in succession. The schematics shown in FIGS. 6a to 6c are illustrative only to demonstrate different configurations for the nodes 14, 20, 22 and is not indicative of a required configured. As such, it can be appreciated that the exact configuration and topology of the network system 12 can vary based on the topology of the underground tunnel 10 network.

FIG. 7 provides further detail of an example of a configuration for an end of line node 22. As explained above, power 60 and network port 84 connections can be connected to any node 14, 20, 22, 36 but must be connected to at least one node in the network. Inside the housing of the end of line node 22 is a mesh node radio 80 that is powered by either an incoming direct current (DC) power source or by DC power supplied on the leaky coaxial cable 16 from another node in the system 12 through a bias Tee 90. A bias Tee 90 is used to filter DC signals from high frequency signals or to insert a DC bias voltage onto a high frequency signal. In this example, the DC signal is transferred to the mesh node radio 80 via a POE injector 95. The radio signals from each of the antenna ports 82 are combined using a splitter/combiner (coax T) 100 and then biased with the DC power using the bias Tee 90. Once combined, the DC and radio signals are then connected to the leaky coaxial cable 16 via a fitting 70 on the enclosure.

The mesh node radio 80 includes an antenna port 82 at each coaxial connection. The mesh node radio 80 also includes a local area network (LAN) port 84. As indicated above, this port 84 can be an 802.3 port for enabling standard Ethernet connections into the network system 12 at various places within the tunnel 10 network. In addition to the port 84, the two radio antenna ports 82 each operate at a different frequency and can connect to other radios at two frequencies simultaneously. Conceivably, a mesh node radio 80 could utilize more than two frequencies in the same fashion to further increase bandwidth and reliability. FIG. 9 shows the mid-span mesh node 14 which is substantially the same in configuration to the end of line node 22 and mobile radio nodes 36 (see FIG. 4). However, in this configuration, an additional Tee 102 is used to provide incoming and outgoing radiating coaxial connections. FIG. 10 is the same internal configuration as a mid-span mesh node 14, but differs by connecting to antennas instead of leaky coaxial cable 16. Since there is no need to filter out the DC power, the bias Tees 90 are not required. FIG. 8 shows a dual radio node 20. This node 20 differs from the others in that it contains two mesh node radios 80. This configuration provides a maximum amount of signal in each leaky coaxial cable 16 since all of the power from each mesh node radio 80 is sent in one direction and can cover the longest distance between nodes along the leaky coaxial cable 16.

Each node 14, 20, 22, 36 is therefore capable of providing mesh and Wi-Fi (802.11) on each mesh node radio 80 port. The Wi-Fi protocol would allow standard wireless equipment to connect to one of the nodes 14, 20, 22, 36. Once a client is authenticated with the nearest node 14, 20, 22, 36 the data can be routed using the mesh protocol to its destination.

FIG. 11 illustrates an example shaft layout, showing the leaky coax cable installed on the wall and a simplified radiating pattern of the cable used to determine the distance between a mobile radio node 36 antenna and the leaky coaxial cable 16. This distance along with other variables discussed further in this document will determine the received signal strength at each radio receiver.

Various testing has been conducted to determine coupling losses and cable attenuation. FIG. 12 illustrates a testing configuration for a first test. As seen in FIG. 12, the first test included testing a radiating cable 16 between two end of line nodes 22. Measurement devices 200 were placed attest points along the radiating cable 16, and monitoring equipment was used to determine the coupling losses and cable attenuation as explained below.

The testing procedures were designed to measure the loss of signal power that results from coupling losses and cable attenuation. Losses occur in many ways however; for the purpose of this test, measuring coupling loss and cable attenuation was the focal point.

Coupling loss ($L_C$) is a ratio of the power inside the cable to the power received by the remote antenna. On product data sheets $L_C$ is equal to the expected received signal from 2 m away from the cable. The value of $L_C$ is given by the following formula:

$$L_C = 10 \text{Log}\left(\frac{P_C}{P_R}\right)$$

Where:
$L_C$ is coupling loss (dB)
$P_C$ is the transmission power in the leaky cable (W)
$P_R$ is the receiving power of the standard dipole antenna (W)

This value can be expressed as either CL50% or CL95%. CL50% refers to a receiving probability of 50% (i.e. 50% of measured values are less than this number), whereas CL95% refers to a receiving probability of 95%. It is noted that coupling loss values typically vary significantly when taking measurements. CL 50% refers to the coupling loss at the 50th percentile, while CL 95% refers to the 95th percentile of measured values. It can be appreciated that CL 95 values can be used from datasheets to calculate a theoretical estimate.

On datasheets, coupling loss is specified at 2 m of the radiating coax according to IEC 61196-4. For longer distances, a correction is applied to maintain accuracy.

As distance increases from the cable, so does coupling loss. For distances greater than 2 m, a correction can be applied to compensate for the additional distance. The theoretical values of coupling loss at 5 m have been adjusted with the following formula:

$$L_C(D_M) = L_C + 20\text{Log}\left(\frac{D_S}{2}\right)$$

Where:
$D_M$ is modified distance
$D_S$ is the 2 m distance specified in the standard For example, 83 dB measured at 2 m distance could be estimated at 90.96 dB at 5 m.

Cable attenuation is the result of losses due to the internal characteristics of the cable. This is given on product datasheets in dB/km.

The overall formula for estimating signal strength at the receiver is:

$$P_R = P_T - L_A - L_C - G_A$$

Where:
$L_C$ is coupling loss (dB)
$P_T$ is the transmit power of the radio (dB)
$L_A$ is the attenuation loss within the cable (dB)
$G_A$ is the passive gain of the receiving antenna (dB)

For the first test, the radiating cable 16 was mounted along a fence. The orientation of the radiating cable 16 is such that the signal propagates parallel with the ground and out from the fence. Each end is connected to the antenna port of the node 20 (Rajant KM3-2409R radio in this test). The first KM3 radio was powered via a POE connector, which receives power from a local DC power source. As indicated above, the instrument layout is shown in FIG. 12. The other KM3 radio was powered by the same DC source transmitted along the leaky coax cable through the bias T as described above.

For the 900 MHz test, a mobile radio was set up using another Rajant KM3 radio and one 10 dBi antenna, for the 2.4 GHz test, a Rajant JR2 radio was used with a 5 dBi antenna. The mobile radio is moved along the length of the radiating cable 16, in a parallel line at distances of 2 meters, and then at 5 meters. As the mobile node moves away from the transmit radio (D) the received signal at the antenna is recorded with monitoring software for both 900 MHz and 2.4 GHz with the mobile antenna oriented in three ways: Perpendicular, horizontal and vertical. Signal strength was recorded at 10 meter intervals of the radiating cable 16.

Test 2

As illustrated in the test results to be summarized below, the tests involved calculating the theoretical received power using the formulae above, compared to values (measured radio received power) received on the testing device in a real-world example. The test results were found to validate the theoretical values prior to implementation.

The following Table A shows the parameters used in the equations for the tests performed at 900 MHz.

TABLE A

Parameters Used for Testing at 900 MHz

| Variables | | | Description |
|---|---|---|---|
| KM3 PTx | 25 | dBm | Maximum radio transmit power including antenna gains |
| Conv KM3 PTx | 20 | dB | Coupler losses + safety margin |
| Loss Margin | 10 | dB | Coupler losses + safety margin |
| Skip GRx | 10 | dBi | Conveyance Antenna Gain |
| Atten. Corr | 25 | % (900 MHz) | Cable |
| Atten. Corr | 60 | % (>2 GHz) | |
| Distance | 100 | m | Radiating Cable Length |

Cable Specs: RCF78-50JFNA

| | 900 MHz | 2.4 GHz | |
|---|---|---|---|
| CL_95% | 78 | 82 | dB |
| Attenuation | 8.4 | 15.3 | dB/100 m |

TABLE A-continued

Parameters Used for Testing at 900 MHz

Radio Rx Sensitivity Vs. Data Rate

| Data Rate (Mbps) | 900 MHz (dBm) | 2.4 GHz (dBm) |
|---|---|---|
| 1 | −97 | −97 |
| 2 | −95 | −96 |
| 6 | −93 | −94 |
| 12 | −91 | −91 |
| 18 | −89 | −90 |
| 24 | −86 | −86 |
| 36 | −82 | −83 |
| 48 | −77 | −77 |
| 54 | −74 | −74 |

The following Table B shows the parameters used in the equations for the tests performed at 2.4 GHz.

TABLE B

Parameters Used for Testing at 2.4 GHz

| Variables | | | Description |
|---|---|---|---|
| KM3 PTx | 25 | dBm | Maximum radio transmit power including antenna gains |
| JR2 PTx | 22 | dB | Coupler losses + safety margin |
| Loss Margin | 10 | dB | Coupler losses + safety margin |
| Skip GRx | 5 | dBi | Conveyance Antenna Gain |
| Atten. Corr | 25 | % (900 MHz) | Cable |
| Atten. Corr | 60 | % (>2 GHz) | |
| Distance | 100 | m | Radiating Cable Length |

Cable Specs: RCF78-50JFNA

| | 900 MHz | 2.4 GHz | |
|---|---|---|---|
| CL_95% | 78 | 82 | dB |
| Attenuation | 8.4 | 15.3 | dB/100 m |

Radio Rx Sensitivity Vs. Data Rate

| Data Rate (Mbps) | 900 MHz (dBm) | 2.4 GHz (dBm) |
|---|---|---|
| 1 | −97 | −97 |
| 2 | −95 | −96 |
| 6 | −93 | −94 |
| 12 | −91 | −91 |
| 18 | −89 | −90 |
| 24 | −86 | −86 |
| 36 | −82 | −83 |
| 48 | −77 | −77 |
| 54 | −74 | −74 |

Test results for 900 MHZ at a distance d=2 m from the cable are provided below in Table 1-1.

TABLE 1-1

Theoretical and actual values for received signal strength at 900 MHZ where distance from the leaky coax is 2 m.
900 MHz with DC Injection
2 m (6'-6") OFFSET FROM CABLE

| LKM3 | | Distance 100 | RSSI @ Mobile (Tx Downstream Radio) | | RSSI @ Mobile (Tx Upstream Radio) | | RSSI @ Downstream (Tx Mobile Radio) | | RSSI @ Upstream (Tx Mobile Radio) | | |
|---|---|---|---|---|---|---|---|---|---|---|---|
| | | | Theo. | Actual | Theo. | Actual | Theo. | Actual | Theo. | Actual | |
| Distance From Shaft Panel | Perpendicular | 0 | −64 | −70 | −53 | −63 | −69 | −61 | −58 | −59 | Perpendicular |
| | | 10 | −62 | −66 | −54 | −63 | −67 | −62 | −59 | −57 | |
| | | 20 | −61 | −63 | −55 | −64 | −66 | −59 | −60 | −59 | |
| | | 30 | −60 | −69 | −56 | −79 | −65 | −66 | −61 | −69 | |
| | | 40 | −59 | −62 | −57 | −75 | −64 | −63 | −62 | −68 | |
| | | 50 | −58 | −65 | −58 | −82 | −63 | −59 | −63 | −76 | |
| | | 60 | −57 | −62 | −59 | −75 | −62 | −59 | −64 | −71 | |
| | | 70 | −56 | −59 | −60 | −80 | −61 | −55 | −65 | −73 | |
| | | 80 | −55 | −53 | −61 | −72 | −60 | −50 | −66 | −66 | |
| | | 90 | −54 | −56 | −62 | −71 | −59 | −50 | −67 | −64 | |
| | | 100 | −53 | −58 | −64 | −70 | −58 | −54 | −69 | −67 | |
| Distance From Shaft Panel | Horizontal | 0 | −64 | −69 | −53 | −68 | −69 | −66 | −58 | −63 | Horizontal |
| | | 10 | −62 | −66 | −54 | −66 | −67 | −62 | −59 | −60 | |
| | | 20 | −61 | −64 | −55 | −67 | −66 | −62 | −60 | −61 | |
| | | 30 | −60 | −58 | −56 | −68 | −65 | −53 | −61 | −60 | |
| | | 40 | −59 | −71 | −57 | −78 | −64 | −68 | −62 | −71 | |
| | | 50 | −58 | −64 | −58 | −73 | −63 | −67 | −63 | −68 | |
| | | 60 | −57 | −73 | −59 | −83 | −62 | −68 | −64 | −75 | |
| | | 70 | −56 | −73 | −60 | −79 | −61 | −67 | −65 | −75 | |
| | | 80 | −55 | −63 | −61 | −71 | −60 | −64 | −66 | −67 | |
| | | 90 | −54 | −68 | −62 | −80 | −59 | −66 | −67 | −77 | |
| | | 100 | −53 | −64 | −64 | −72 | −58 | −62 | −69 | −68 | |
| Distance From Shaft Panel | Vertical | 0 | −64 | −72 | −53 | −78 | −69 | −82 | −58 | −71 | Vertical |
| | | 10 | −62 | −75 | −54 | −73 | −67 | −70 | −59 | −69 | |
| | | 20 | −61 | −74 | −55 | −71 | −66 | −67 | −60 | −72 | |
| | | 30 | −60 | −73 | −56 | −88 | −65 | −74 | −61 | −80 | |
| | | 40 | −59 | −70 | −57 | −85 | −64 | −67 | −62 | −75 | |
| | | 50 | −58 | −72 | −58 | −90 | −63 | −66 | −63 | −81 | |
| | | 60 | −57 | −71 | −59 | −84 | −62 | −67 | −64 | −75 | |
| | | 70 | −56 | −70 | −60 | −81 | −61 | −68 | −65 | −74 | |
| | | 80 | −55 | −63 | −61 | −83 | −60 | −58 | −66 | −75 | |
| | | 90 | −54 | −62 | −62 | −77 | −59 | −57 | −67 | −71 | |
| | | 100 | −53 | −75 | −64 | −81 | −58 | −69 | −69 | −75 | |

Test results for 900 MHz at a distance of d=5 m are provided below in Table 1-2.

TABLE 1-2

Theoretical and actual values for received signal strength at 900 MHZ where distance from the leaky coax is 5 m.
900 MHz with DC Injection
5 m (16'-6") OFFSET FROM CABLE

| LKM3 | | Distance 100 | RSSI @ Mobile (Tx Downstream Radio) | | RSSI @ Mobile (Tx Upstream Radio) | | RSSI @ Downstream (Tx Mobile Radio) | | RSSI @ Upstream (Tx Mobile Radio) | | |
|---|---|---|---|---|---|---|---|---|---|---|---|
| | | | Theo. | Actual | Theo. | Actual | Theo. | Actual | Theo. | Actual | |
| Distance From Shaft Panel | Perpendicular | 0 | −71 | −80 | −61 | −72 | −76 | −72 | −58 | −69 | Perpendicular |
| | | 10 | −70 | −69 | −62 | −68 | −75 | −68 | −59 | −63 | |
| | | 20 | −69 | −70 | −63 | −71 | −74 | −66 | −60 | −68 | |
| | | 30 | −68 | −68 | −64 | −75 | −73 | −64 | −61 | −69 | |
| | | 40 | −67 | −70 | −65 | −81 | −72 | −68 | −62 | −77 | |
| | | 50 | −66 | −75 | −66 | −78 | −71 | −71 | −63 | −73 | |
| | | 60 | −65 | −67 | −67 | −77 | −70 | −64 | −64 | −73 | |
| | | 70 | −64 | −73 | −68 | −82 | −69 | −71 | −65 | −78 | |
| | | 80 | −63 | −66 | −69 | −77 | −68 | −61 | −66 | −70 | |
| | | 90 | −62 | −63 | −70 | −85 | −67 | −60 | −67 | −74 | |
| | | 100 | −61 | −63 | −71 | −73 | −66 | −62 | −69 | −69 | |

TABLE 1-2-continued

Theoretical and actual values for received signal strength at 900 MHZ where distance from the leaky coax is 5 m.
900 MHz with DC Injection
5 m (16'-6") OFFSET FROM CABLE

| | LKM3 | Distance | RSSI @ Mobile (Tx Downstream) | | RSSI @ Mobile (Tx Upstream Radio) | | RSSI @ Downstream (Tx Mobile Radio) | | RSSI @ Upstream (Tx Mobile Radio) | | |
|---|---|---|---|---|---|---|---|---|---|---|---|
| | | 100 | Theo. | Actual | Theo. | Actual | Theo. | Actual | Theo. | Actual | |
| Distance | Horizontal | 0 | −71 | −86 | −61 | −87 | −76 | −83 | −58 | −81 | Horizontal |
| From | | 10 | −70 | −82 | −62 | −80 | −75 | −76 | −59 | −75 | |
| Shaft | | 20 | −69 | −71 | −63 | −69 | −74 | −69 | −60 | −63 | |
| Panel | | 30 | −68 | −71 | −64 | −70 | −73 | −71 | −61 | −65 | |
| | | 40 | −67 | −71 | −65 | −77 | −72 | −71 | −62 | −71 | |
| | | 50 | −66 | −77 | −66 | −81 | −71 | −74 | −63 | −75 | |
| | | 60 | −65 | −72 | −67 | −79 | −70 | −70 | −64 | −74 | |
| | | 70 | −64 | −72 | −68 | −86 | −69 | −68 | −65 | −85 | |
| | | 80 | −63 | −66 | −69 | −85 | −68 | −69 | −66 | −79 | |
| | | 90 | −62 | −71 | −70 | −84 | −67 | −66 | −67 | −81 | |
| | | 100 | −61 | −72 | −71 | −79 | −66 | −70 | −69 | −75 | |
| Distance | Vertical | 0 | −71 | | −61 | | −76 | | −58 | | Vertical |
| From | | 10 | −70 | | −62 | | −75 | | −59 | | |
| Shaft | | 20 | −69 | | −63 | | −74 | | −60 | | |
| Panel | | 30 | −68 | | −64 | | −73 | | −61 | | |
| | | 40 | −67 | | −65 | | −72 | | −62 | | |
| | | 50 | −66 | | −66 | | −71 | | −63 | | |
| | | 60 | −65 | | −67 | | −70 | | −64 | | |
| | | 70 | −64 | | −68 | | −69 | | −65 | | |
| | | 80 | −63 | | −69 | | −68 | | −66 | | |
| | | 90 | −62 | | −70 | | −67 | | −67 | | |
| | | 100 | −61 | | −71 | | −66 | | −69 | | |

Test results for 2.4 GHz at a distance of d=2 m from the cable are provided below in Table 1-3.

Test results for 2.4 GHz at distances of both d=2 m and 2=5 m from the cable are provided below in Table 1-4.

TABLE 1-3

Theoretical and actual values for received signal strength at 2400 MHZ where distance from the leaky coax is 2 m.
JR2 Radio Reception (Conveyance)

| | JR2 | Distance | Conveyance Distance from Radiating Cable | | | | | | |
|---|---|---|---|---|---|---|---|---|---|
| | | | 2 m | | | 5 m | | | |
| | | 100 | Theo. | Actual | SNR | Theo. | Actual | SNR | |
| Distance | Perpendicular | 0 | −62 | 47 | 51 | −70 | −55 | 52 | Perpendicular |
| From | | 10 | −64 | −48 | 56 | −72 | −45 | 53 | |
| Shaft | | 20 | −67 | −47 | 54 | −75 | −55 | 43 | |
| Panel | | 30 | −69 | −47 | 47 | −77 | −61 | 51 | |
| | | 40 | −72 | −49 | 54 | −80 | −60 | 39 | |
| | | 50 | −74 | −53 | 48 | −82 | −63 | 39 | |
| | | 60 | −77 | −59 | 40 | −85 | −53 | 40 | |
| | | 70 | −79 | −64 | 36 | −87 | −55 | 45 | |
| | | 80 | −82 | −61 | 441 | −90 | −60 | 35 | |
| | | 90 | −84 | −59 | 43 | −92 | −72 | 27 | |
| | | 100 | −86 | −61 | 40 | −94 | −74 | 26 | |
| Distance | Horizontal | 0 | −62 | 47 | 51 | −70 | −53 | 55 | Horizontal |
| From | | 10 | −64 | −51 | 45 | −72 | −44 | 57 | |
| Shaft | | 20 | −67 | −44 | 58 | −75 | −52 | 46 | |
| Panel | | 30 | −69 | −54 | 47 | −77 | −57 | 44 | |
| | | 40 | −72 | −49 | 51 | −80 | −51 | 45 | |
| | | 50 | −74 | −56 | 46 | −82 | −54 | 40 | |
| | | 60 | −77 | −59 | 38 | −85 | −58 | 44 | |
| | | 70 | −79 | −65 | 34 | −87 | −70 | 29 | |
| | | 80 | −82 | −62 | 40 | −90 | −75 | 25 | |
| | | 90 | −84 | −58 | 44 | −92 | −61 | 36 | |
| | | 100 | −86 | −73 | 28 | −94 | −64 | 36 | |

TABLE 1-3-continued

Theoretical and actual values for received signal strength at 2400 MHZ where distance from the leaky coax is 2 m.
JR2 Radio Reception (Conveyance)

| JR2 | | Conveyance Distance from Radiating Cable | | | | | | |
|---|---|---|---|---|---|---|---|---|
| | Distance | 2 m | | | 5 m | | | |
| | 100 | Theo. | Actual | SNR | Theo. | Actual | SNR | |
| Distance Vertical | 0 | −62 | −54 | 60 | −70 | −43 | 58 | Vertical |
| From | 10 | −64 | −55 | 45 | −72 | −43 | 59 | |
| Shaft | 20 | −67 | −46 | 56 | −75 | −50 | 52 | |
| Panel | 30 | −69 | −46 | 55 | −77 | −52 | 58 | |
| | 40 | −72 | −50 | 50 | −80 | −58 | 40 | |
| | 50 | −74 | 47 | −57 | −82 | −61 | 41 | |
| | 60 | −77 | −57 | 44 | −85 | −65 | 38 | |
| | 70 | −79 | −55 | 44 | −87 | −55 | 42 | |
| | 80 | −82 | −51 | 52 | −90 | −64 | 37 | |
| | 90 | −84 | −63 | 37 | −92 | −63 | 32 | |
| | 100 | −86 | −79 | 32 | −94 | −57 | 44 | |

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. An integrated leaky feeder and mesh network system for providing communication coverage in an underground environment, the system comprising:
   a plurality of mesh nodes, each mesh node comprising a radio, at least one of the mesh nodes being powered by a power source; and
   one or more radiating coaxial cables physically interconnecting the plurality of mesh nodes to provide a leaky feeder signal between the mesh nodes, thereby creating a hardwired self-configuring mesh network and simultaneously providing wireless communication coverage in the underground environment, wherein:
   each segment of the radiating coaxial cable is adapted to allow carrying a different signal;
   the one or more radiating coaxial cables and the plurality of mesh nodes are configured to operate at the same frequencies to accommodate connection of wireless devices to each of the plurality of mesh nodes and the one or more radiating cables along a length thereof; and
   the one or more radiating coaxial cables and the plurality of mesh nodes are connected to provide multiple coexistent communication routes for a communication signal within the hardwired self-configuring mesh network, thereby allowing dynamic switching of communication routes in real time.

2. The system of claim 1, wherein the mesh nodes interface with the radiating coaxial cables via simulated air gaps normally experienced by the radios in mesh networks.

3. The system of claim 1, wherein at least one of the plurality of mesh nodes is powered by an incoming signal on a first radiating coaxial cable, and powers a downstream mesh node on a second radiating coaxial cable between adjacent mesh nodes.

4. The system of claim 1 whereby a first mesh node of the plurality of mesh nodes is connected to at least one further mesh node downstream of the first mesh node.

5. The system of claim 4, further comprising a bias Tee at one or more of: the end of a terminating one of the radiating coaxial cables, or an open port in the system.

6. The system of claim 4, wherein at least one further mesh node comprises an additional power supply and/or an external network interface.

7. The system of claim 6, wherein the additional power supply comprises a battery back-up.

8. The system of claim 1, wherein the power source is connected to a primary power supply.

9. The system of claim 8, wherein the primary power supply comprises a battery back-up.

10. The system of claim 1, wherein the radio comprises a network input port to enable a direct data connection at the respective mesh node of the plurality of mesh nodes.

11. The system of claim 1, wherein the plurality of mesh nodes comprises at least one end of line mesh node, at least one dual radio mesh node, and at least one mid-span mesh node.

12. The system of claim 1, further comprising at least one mobile radio positioned in a mine shaft.

13. The system of claim 12, wherein the mobile radio is supported on a conveyance in the mine shaft.

14. The system of claim 1, further comprising an alternative communication medium connecting a first plurality of mesh nodes in a first tunnel to a second plurality of mesh nodes in a second tunnel.

15. The system of claim 1, wherein at least one of the mesh nodes comprises a POE injector.

* * * * *